(12) United States Patent
Baba et al.

(10) Patent No.: US 6,809,298 B2
(45) Date of Patent: Oct. 26, 2004

(54) THERMAL INSULATION CONTAINER WITH ELECTRIC HEATER

(75) Inventors: Naoho Baba, Tokyo (JP); Takafumi Fujii, Tokyo (JP); Isao Watanabe, Tokyo (JP)

(73) Assignee: Thermos K.K., Niigata-Ken (JP)

( * ) Notice: Subject to any disclaimer, the term of this patent is extended or adjusted under 35 U.S.C. 154(b) by 11 days.

(21) Appl. No.: 10/439,871

(22) Filed: May 16, 2003

(65) Prior Publication Data

US 2003/0222074 A1 Dec. 4, 2003

(30) Foreign Application Priority Data

May 30, 2002 (JP) ......................................... 2002-157345

(51) Int. Cl.[7] .............................. H05B 3/16; H05B 3/26; A47J 27/21; A47J 36/26
(52) U.S. Cl. ........................ 219/438; 219/387; 219/543; 219/544; 219/548
(58) Field of Search ................................. 219/436, 438, 219/387, 521, 522, 538, 542–544, 546, 548, 552, 553

(56) References Cited

U.S. PATENT DOCUMENTS

| 4,250,398 A | * | 2/1981 | Ellis et al. | .................. 219/553 |
| 6,125,234 A | * | 9/2000 | de Jenlis | ..................... 219/521 |
| 2002/0175158 A1 | * | 11/2002 | Sanoner et al. | ............. 219/387 |

FOREIGN PATENT DOCUMENTS

| JP | 07163455 A | * | 6/1995 |
| JP | 2000005063 A | * | 1/2000 |

\* cited by examiner

*Primary Examiner*—J Pelham
(74) *Attorney, Agent, or Firm*—J.C. Patents

(57) ABSTRACT

A thermal-insulation container with electric heater comprising an inner container and an outer container, said inner container being housed into the outer container integrally therewith so as to define a closed space separating the same from the outer container comprises a highly-resistive metal oxide film formed on an outer surface of said inner container facing said closed space, and an electrode unit provided on the highly-resistive metal oxide film facing said closed space for applying an electric current thereto.

6 Claims, 6 Drawing Sheets

THERMAL INSULATION CONTAINER WITH ELECTRIC HEATER

CROSS-REFERENCE TO RELATED APPLICATION

This application claims the priority benefit of Japanese application serial no. 2002-157345, filed on May 30, 2002.

BACKGROUND OF THE INVENTION

1. Field of the Invention

The present invention generally relates to a thermal-insulation container with electric heater, and more particularly relates to a thermal-insulation container with electric heater having improved thermal efficiency.

2. Description of the Related Art

A thermal-insulation container with electric heater having an inner container made of metal, an outer container and a thermal barrier interposed therebetween with an electric heater provided in the middle and bottom portions of the inner container is well known in the art.

In such a thermal-insulation container with electric heater of the prior art, since the inner container is made of a metal having a thermal conductivity, heat is transmitted therethrough to be dissipated from a container opening, disadvantageously resulting in increased power consumption. Such a heat loss becomes remarkable especially when the container has a large opening. Generally, heaters used for such thermal insulation containers of the prior art include sheathed heaters, mica-insulated heaters, and the like.

In those thermal-insulation containers with electric heater is provided with an electric heater on the lower external surface of the inner container, it is necessary to additionally provide a screw receptacle for ensuring a secure contact of the heater to the inner container at its lower part. Further, in such a type of thermal-insulation container with electric heater of the prior art having an air pump to pump up the hot water from the container, it is necessary to provide a liquid port in the bottom of the inner container. Therefore, as the bottom of inner containers becomes more complicated in shape, it has become necessary to manufacture heaters therefor more elaborately so as to fit well into a place in the bottom they are mounted.

Further, of the heat generated by a heater as described above, specifically the heat that is generated from the surface contacting the inner container is transmitted thereto by conduction to be used efficiently for heating and keeping warm water or other liquid in the inner container.

However, the heat generated from the closed space side of the heater escapes as radiant heat towards the outer-container side and does not contribute to heating and thermal-insulation efficiency, thus tending to increase heat loss. Thus, these thermal-insulation containers of the prior art disadvantageously involve a lower thermal efficiency. In order to make up for this, it has been proposed to provide a protruding heater retainers in the bottom of the inner container to increase the contact area between the heater and the bottom, or alternatively to provide a multitude of semi-spherical protrusions in the bottom of the inner container to increase its surface area.

Accordingly, it is an object of the present invention to provide an improved thermal-insulation container with electric heater having a good thermal efficiency, and also which is easy to manufacture.

SUMMARY OF THE INVENTION

In one aspect of the present invention, a thermal-insulation container with electric heater having an inner container and an outer container, the inner container being housed in the outer container integrally therewith so as to define a closed space separating the same from the outer container, comprises a highly-resistive metal oxide film formed on an external surface of said inner container facing said closed space, and an electrode unit provided on an external surface of the highly-resistive metal oxide film facing the closed space for applying an electric current to the highly-resistive metal oxide film, wherein the highly-resistive metal oxide film reflects incident infrared rays by at least 40%.

In another aspect of the present invention, a thermal-insulation container with electric heater having an inner container and an outer container, the inner container being housed in the outer container integrally therewith so as to define a closed space separating the same from the outer container, comprises a highly-resistive metal oxide film formed on an external surface of said inner container facing said closed space, an electrode unit provided on an external surface of said highly-resistive metal oxide film facing said closed space for applying an electric current to said highly-resistive metal oxide film, and a highly-reflective metal oxide film reflecting incident infrared rays by at least 40% provided on an external surface of said highly-resistive metal oxide film facing said closed space through the intermediary of an insulator film interposed therebetween.

In yet another aspect of the present invention, it is preferred that the outer container and the inner container are made of glass and that the highly-resistive metal oxide film, the insulator film and the highly-reflective metal oxide film are transparent.

In still another aspect of the present invention, it is preferred that the inner container is joined with the outer container only at and along a peripheral edge of an opening of the thermal-insulation container with electric heater.

According to the present invention, a thermal-insulation container with electric heater has a double-walled structure in which an inner container is housed in an outer container integrally therewith so as to define a closed space separating the same from the outer container, and on an outer surface of the inner container facing the closed space is formed a metal oxide film having a high resistivity (herein referred to as a highly-resistive metal oxide file) and on the highly resistive metal oxide film facing the closed space is provided an electrode unit for applying an electric current to said highly-resistive metal oxide film.

When passing an electric current through the highly-resistive metal oxide film, heat is generated by its electric resistance and thus the highly-resistive metal oxide film serves as a heater. In order to make the heat generated by the highly-resistive metal oxide film act efficiently to heat the inner container, a metal oxide film having a high reflectance (herein referred to as a highly-reflective metal oxide film) may be provided on the surface of the highly-resistive metal oxide film facing the closed space. However, if this highly-resistive metal oxide film itself is formed as a coating having a high reflectance (low emissivity), even a single layer of such highly-resistive metal oxide film will bring forth a sufficient heat insulation efficiency to substantially reduce radiant heat loss from the inner container.

In a preferred embodiment of the thermal-insulation container with electric heater according to the present invention, a highly-reflective metal oxide film is provided on the surface of the highly-resistive metal oxide film facing the closed space through the intermediary of an insulator film interposed therebetween.

Since such a highly-reflective metal oxide film has a low emissivity (that is, a high reflectance), it can reduce the quantity of heat emitted to the closed space side (heat loss) as radiant heat of the highly-resistive metal oxide film.

The insulator film electrically insulates the highly-resistive metal oxide film and the highly-reflective metal oxide film, so that the current flows only through the highly-resistive metal oxide film. The insulator film also acts to prevent sodium ($Na^+$) ions or other impurity ions contained in the highly-resistive metal oxide film from diffusing and migrate into the highly-reflective metal oxide film when the latter film is formed, consequently preventing a reduction of the reflectance efficiency of the highly-reflective metal oxide film and its effectiveness to prevent the radiant heat transmission. In other words, the insulator film prevents a migration of impurity ions from the highly-resistive metal oxide film into the high reflectance oxide film and thus plays an important role in the prevention of performance degradation of the highly-reflective metal oxide film.

Further, according to the present invention, it is preferred that the closed space separating the inner container from the outer container is hermetically sealed, and the closed space may be evacuated or filled with an inert gas such as krypton, xenon or argon gas which is thermally less conductive than air so that it can serve effectively as a thermal barrier to improve its thermal-insulation efficiency. Especially, if the closed space is evacuated, it can maintain its high reflectance (low emissivity) over a long period of time, because under vacuum the highly-reflective metal oxide film will neither adsorb moisture etc. nor be coordinated with excessive oxygen and it is not oxidized even when functioning as a heater to be placed under a high temperature condition.

In a preferred embodiment of the present invention, the thermal-insulation container with electric heater in which its inner and an outer containers are made of glass and both the highly-resistive metal oxide film and highly-reflective metal oxide film are transparent as well as the insulator film, and therefore the content of the inner container can be readily visualized.

Although the prior art heat-insulating containers made of glass exhibit a substantial heat loss due to heat conduction through a pad used for the positioning of inner container and outer containers, the thermal-insulation container with electric heater according to the present invention achieves a further improvement in thermal-insulation efficiency, because its inner and outer containers are joined only at its opening so that the closed space defined between the inner and outer containers serves as a heat barrier to suppress heat loss attributable to heat conduction.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

DESCRIPTION OF THE PREFERRED EMBODIMENT

Figure 1:
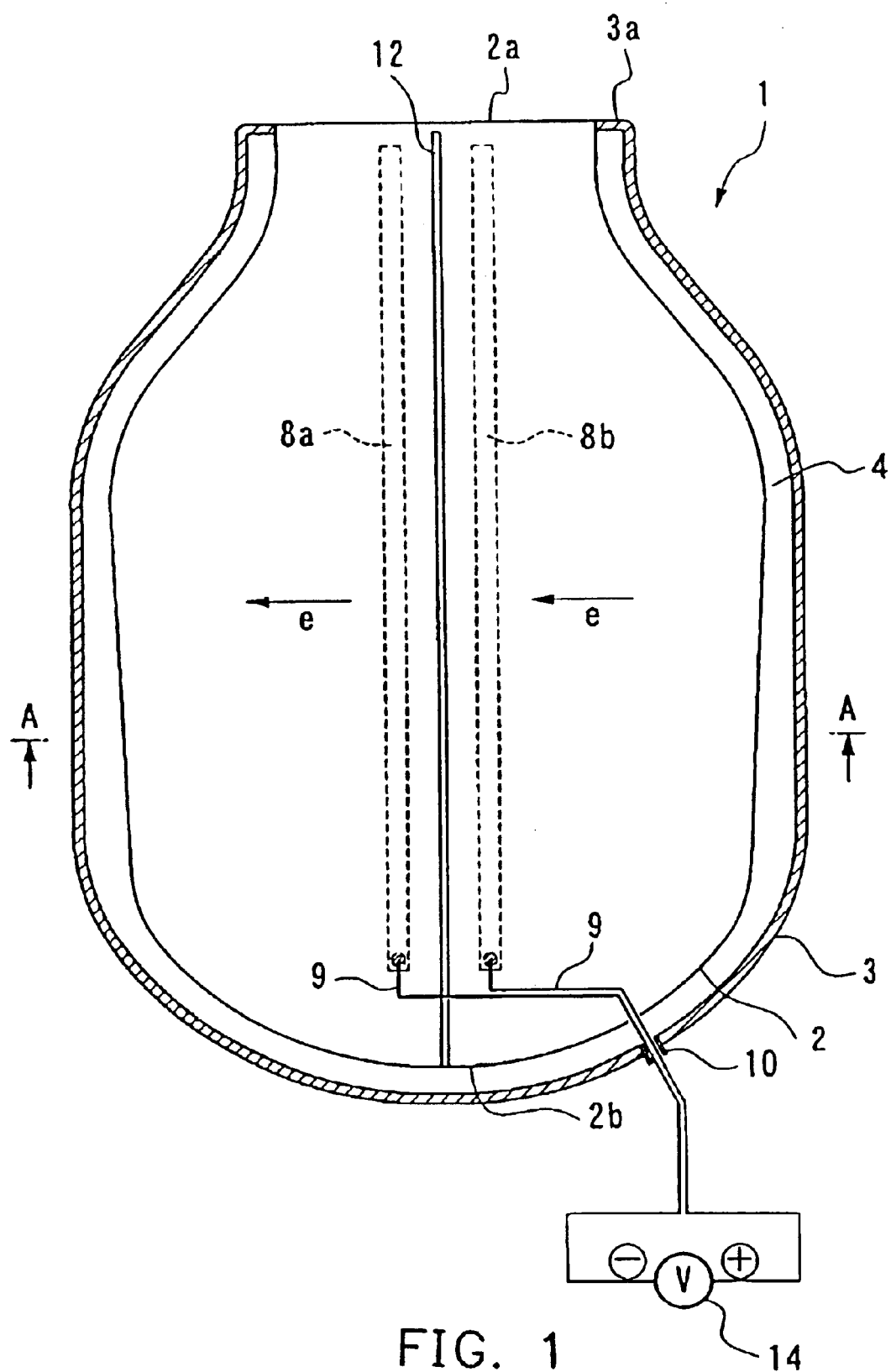
FIG. 1 is an axial view of a thermal-insulation container with electric heater according to a preferred embodiment of the present invention.

Referring now to the accompanying drawings, especially to FIG. 1, a thermal-insulation container with electric heater 1 of a preferred embodiment of the present invention comprises an inner container 2 and an outer container 3.

As shown in FIG. 1, the thermal-insulation container with electric heater 1 comprises a double-walled structure in which an inner container 2 is housed in an outer container 3 so as to define a closed space 4 separating the same from the outer container 3, with the inner and outer containers 2 and 3 being joined together along their openings.

A highly-resistive metal oxide film 5 is formed on an outer surface of the inner container 2 facing the closed space 4, an insulator film 6 is formed on the highly-resistive metal oxide film 5, and further a highly-reflective metal oxide film 7 is laminated on the insulator film 6.

Preferably, the inner container 2 and the outer container 3 are formed of a transparent glass such as soda glass or borosilicate glass.

Preferably, the highly-resistive metal oxide film 5 is made of at least one material selected from a group consisting of $In_2O_3$—$SnO_2$ (hereinafter shall be referred to as ITO), $Sb_2O_3$—$SnO_2$ (hereinafter shall be referred to as ATO), $Al_2O_3$—$ZnO$ (hereinafter shall be referred to as AZO), $F_2$—$SnO_2$ (hereinafter shall be referred to as FTO), $F_2$—$ZnO$ (hereinafter shall be referred to as FZO), and $GaO_2$—$ZnO$ (hereinafter shall be referred to as GZO).

Preferably, the highly-resistive metal oxide film 5 has a thickness in a range of approximately about 50 nanometer (nm) to 1 micrometer.

Preferred methods of forming the highly-resistive metal oxide film 5 include a sol-gel process, a vacuum deposition process or a sputtering process, although the sol-gel process is more preferable.

Further, the highly-resistive metal oxide film 5 may be formed so as to cover either the whole or a part of the external surface of the inner container 2.

In the preferred thermal-insulation container with electric heater 1 shown in FIG. 1, a slit 12 is formed in the highly-resistive metal oxide film 5 so as to extend axially of the inner container 2 from its opening 2a to a bottom 2b, in other words, the highly-resistive metal oxide film 5 is not formed on that portion which forms the slit 12.

Preferably, the highly-resistive metal oxide film 5 has a resistivity (specific resistance) higher than approximately $1\times10^{-5}$ ohm-cm (-cm) as measured based on the van der Pauw's method (see "Electrically-Conductive Transparent Film Technology", 1st ed., (by Ohmsha Ltd., Tokyo, Japan), 271–272 pages), because with a resistivity lower than this value, the highly-resistive metal oxide film becomes rather hard to generate heat, in other words, causes deterioration of heat generation efficiency, and thus a lowered electric resistance increases the manufacturing cost. An upper limit of the resistivity of the highly-resistive metal oxide film is set at approximately about 0.1-cm. With a resistivity exceeding 0.1-cm, the highly-resistive metal oxide film 5 will cause an unacceptably rapid increase in the temperature to increase an internal stress in the glass, probably resulting in the breakage of the thermal-insulation container with electric heater 1.

The highly-resistive metal oxide film 5 may be formed directly on the external surface of the inner container 2, while it may be provided on an $SiO_2$ film formed on the external surface of the inner container where any scratch or the like damages exist in the external surface of the inner container 2.

Materials used for the electrode unit 8 include, but not limited to, metals such as silver, copper, nickel and the like, or semiconductor materials.

It is preferable to use thin strips for making the electrode unit 8 since these can be easily soldered to the highly-resistive metal oxide film 5, or it may be formed by a sputtering or vapor deposition process, however, it is to be understood that the above mentioned processes are not particularly limited for making the electrode unit 8.

In the thermal-insulation container with electric heater 1 shown in FIG. 1, electrodes 8a and 8b constituting the electrode unit 8 extend from an opening 2a of the inner container 2 to its bottom 2b positioned parallel and adjacent to each other with a slit 12 interposed therebetween. The Electrodes 8a and 8b are connected to a power supply 14 through a pair of conductors 9, 9, which is connected by soldering or joint in a manner, to the lower ends of the electrodes 8a and 8b. The conductors 9, 9, are covered with an electrically-insulating material.

Figure 2:
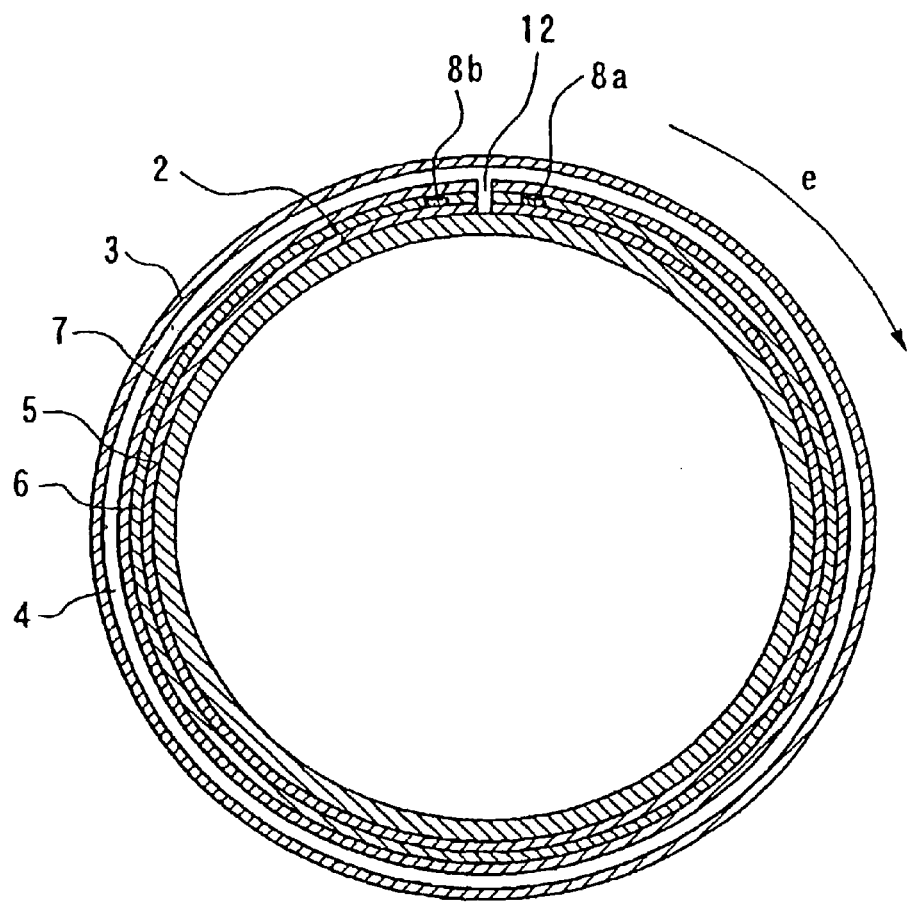
FIG. 2 is a cross-sectional view taken on the line A—A of FIG. 1.

Since the slit 12 is provided in the highly-resistive metal oxide film 5, the electric current flows along the peripheral direction of the thermal-insulation container with electric heater 1 as illustrated by arrow e in FIGS. 1 and 2. Although the preferred structure of the thermal-insulation container with electric heater 1 shown in FIG. 1 has a slit in the insulator film 6 and the highly-reflective metal oxide film 7, the insulator film 6 can omit the slit without causing any problem. The highly-reflective metal oxide film 7 formed on the insulator film 6 may also omit the slit.

Preferably, the insulator film 6 is made of at least one material selected from a group consisting of $SiO_2$, $All_2O_3$, $CaF_2$ (fluorite) and $TiO_2$.

The insulator film 6 preferably has a thickness ranging from approximately about 50 nm to 1 $\mu$m (micron).

Preferred methods for forming the insulator film 5 include a sol-gel process, a vacuum deposition process or a sputtering process, although the sol-gel process is more preferable.

It is preferred that the highly-reflective metal oxide film 7 is made of at least one material selected from a group consisting of ITO, ATO, AZO, FTO, FZO and GZO. Especially, ITO is preferred.

Preferably, the highly-reflective metal oxide film 7 has a thickness ranging from approximately about 50 nm to 1 $\mu$m.

Preferred methods for forming the insulator film 7 include a sol-gel process, a vacuum deposition process or a sputtering process, although the sol-gel process is more preferable.

Any highly-reflective metal oxide films may be used, so long as such films reflect incident infrared rays by at least approximately 40%. Especially, it is preferred to use a highly-reflective metal oxide film that can reflect infrared rays having approximately 15$\mu$ or longer wavelengths by at least approximately 40%. With a reflectance below 40%, the heat loss due to radiation increases and thus the thermal-insulation efficiency of the thermal-insulation container with electric heater will be lowered.

If a material of the highly-resistive metal oxide film 5 itself has the capability to reflect the infrared rays by at least approximately 40%, then it is not necessary to provide the highly-resistive metal oxide film 5 with a insulator film 6.

Figure 3:
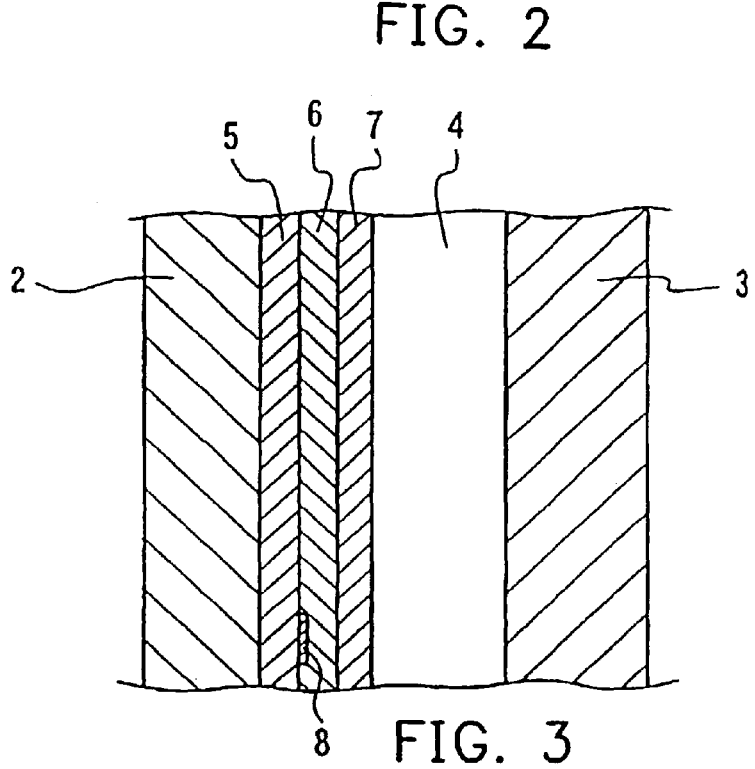
FIG. 3 is an enlarged partial sectional view showing a detailed structure of the thermal-insulation container with electric heater of FIG. 1.

Referring now to FIG. 3, the electrode unit 8 used in the thermal-insulation container with electric heater 1 of the present invention is shown in greater detail.

On the highly-resistive metal oxide film 5 and the electrode unit 8 formed on the highly-resistive metal oxide film 5, the insulator film 6 and the highly-reflective metal oxide film 7 are laminated on their surfaces closer to the closed space in the order as shown in FIG. 3.

Figure 4:
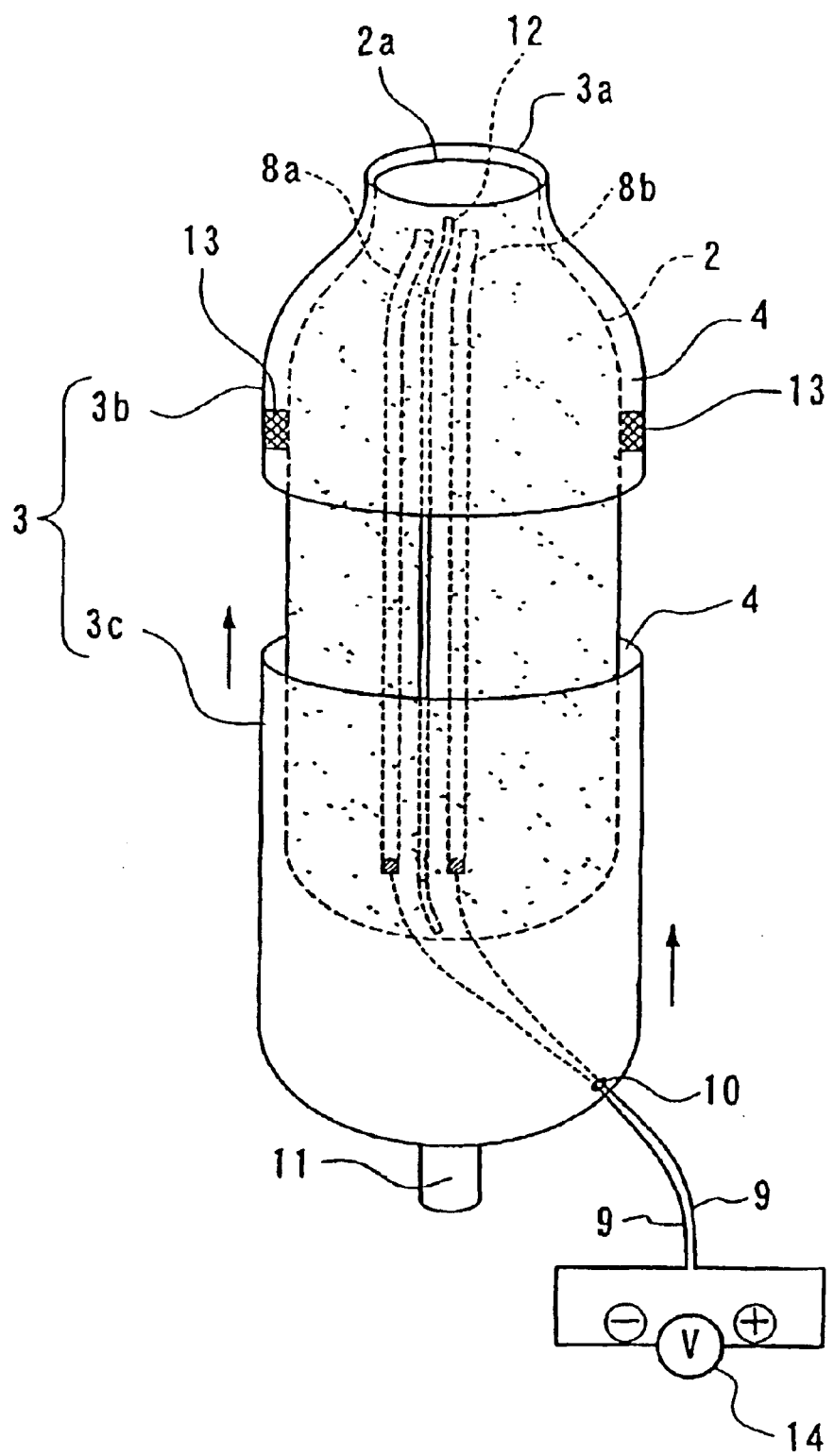
FIG. 4 is a perspective view of the preferred embodiment shown in FIG. 1.

Referring now to FIG. 4, a process for manufacturing the thermal-insulation container with electric heater 1 of the present invention will be described as follows.

First, an inner container 2 having an opening 2a is formed into a desired shape.

Then, an outer container 3 substantially similar in shape as the inner container 2 is formed with such a size dimension that allows the inner container 2 to be housed into the outer container 3 and separated by a closed space 4 defined between the two containers 2 and 3. Further, as shown, the outer container 3 comprises an upper outer container half 3b having an opening 3a and lower outer container half 3c having a conductor port 10 and a tip tube 11 for degassing. The conductor port 10 is provided for passing the conductors 9, 9, which is sealed after passing the conductors, and it may be provided at two locations in the outer container 2, or it may be a closed structure or a hermetically sealed structure. The tip tube 11 is provided for degassing the closed space 4.

Thereafter, an ITO film is formed on the external surface of the inner container 2 to form a highly-resistive metal oxide film 5. The highly-resistive metal oxide film 5 may be formed using a sol-gel process, and the sol-gel process may include preparing a solution of a metal complex and then applying the solution of the metal complex to the external surface of the inner container 2, and thereafter the applied metal complex is heated to be thermally decomposed to form the highly-resistive metal oxide film 5.

By way of an example, the coating solution is prepared first by dissolving 4 mass % of a metal (In: Sn=95-80:5-20) in a solvent (10 mass % of acetylacetone, 25 mass % of isopropyl alcohol, 25 mass % of ethanol, and 30 mass % of propylene-glycol). Subsequently, this coating solution is applied onto the external surface of the inner container 2 and then the excess applied solution is removed. Next, the coating is left to stand at room temperature or heated to evaporate the solvent.

After ensuring that the solvent has been fully removed, the temperature is then raised to about 300–600° C. to accomplish thermal decomposition of the metal complex. This heat treatment effects an oxidization of metals (In, Sn) to produce the highly-resistive metal oxide film 5.

Removal of the solvent and completion of the thermal decomposition are determined from the temperature and the color of the film determined based on a pre-verified TG-DTA (differential thermal-thermo-gravimetric analysis) curve.

The film thickness that can be achieved in a single process step may be adjusted to some extent by varying the concentration of the coating solution or the like. The above-described coating solution can achieve a film thickness in the range of approximately 0.05–0.5 micrometers, and if the highly-resistive metal oxide film 5 with a thickness higher than 0.5 micrometers is desired, then the above-mentioned coating process may be repeated several times until a desired thickness is achieved.

Next, electrodes 8a and 8b are formed on the highly-resistive metal oxide film 5, and conductors 9, 9 are connected to the electrodes 8a and 8b, for example by soldering.

In the instant preferred embodiment, a slit 12 is provided in the highly-resistive metal oxide film 5 axially with respect to the inner container 2, and electrodes 8a and 8b are provided on either side of the slit 12, as shown in FIG. 1. The slit 12 may be provided by masking a predetermined position where it is to be formed, then after applying the coating solution for forming the highly-resistive metal oxide film 5 on the entire external surface of the inner container 2 and thereafter the mask is removed. The slit 12 may also be formed by etching the highly-resistive film 5 formed on the inner container. For example, when ITO which is a crystalline indium-tin oxide is used for the coating solution, aqua-regia (mixed acid of hydrochloric acid and nitric acid) or hydrochloric acid/iron chloride-based solution which is strong acid may be used in an etching process for forming the electrodes, and such an etching solution may be also used to form the slit 12.

Then, an insulator film 6 is formed on the surface of the highly-resistive metal oxide film 5 facing the closed space 4. When using a sol-gel process, it may be accomplished by following the process steps described below. First, a coating solution containing $SiO_2$ and other ingredients is prepared and applied onto the external surface of the highly-resistive metal oxide film 5. Then, the applied coating is heated to effect hydrolysis and polymerization therein so as to form the insulator film 6.

By way of an example, a coating solution containing 28.9 mass % of $Si(OC_2H_5)_4$, 43.5 mass % of $C_2H_5OH$, 27.2 mass % of $H_2O$, and 0.003 mass % of HCl is prepared first. Subsequently, this coating solution is applied onto the external surface of the highly-resistive metal oxide film 5. Then, the applied coating is subjected to hydrolysis and polymerization reaction at a temperature of about 300–500° C. The resultant film ($SiO_2$) will be transparent.

Then, a highly-reflective metal oxide film 7 is formed on the surface insulator film 6 facing the closed space 4. When using a sol-gel process, it may be accomplished by following the process steps described below. First, a metal oxide film is formed on an external surface of the insulator film 6 by using a similar process for forming the highly-resistive metal oxide film 5 as described above, and the resultant metal oxide film is subjected to reduction by heat treatment (annealing) at about 400–600° C. under vacuum or in other reducing atmospheres to increase the reflectance of the metal oxide film. Thus a highly-reflective metal oxide film 7 is produced.

By way of an example, to provide ITO film serving as the highly-reflective metal oxide film 7, first a coating solution containing is prepared by dissolving 4 mass % of a metal (In:Sn=95-80:5-20) in a solvent containing 10 mass % of acetylacetone, 25 mass % of isopropyl alcohol, 25 mass % of ethanol, and 30 mass % of propylene glycol.

Subsequently, this coating solution is applied onto the external surface of the insulator film 6. Then, after removing the excess applied solution, the applied coating is left to stand at room temperature or heated to evaporate the solvent.

After ensuring that the solvent has been fully removed, temperature is then raised to about 400–700° C. to accomplish thermal decomposition.

Removal of the solvent and completion of the thermal decomposition are determined by observing the temperature and the color of the film on a pre-verified TG-DTA (differential thermal-thermo-gravimetric analysis) curve.

When the above-mentioned coating solution is used, the resultant film of the metal oxide produced by thermal decomposition process is transparent having a yellowish tint. Then, the upper part of an inner container 2 is placed in the upper container half 3b, and these are joined together by fusing the peripheral edge of the opening 2a of the inner container 2 and the opening 3a of the outer container 3 in a manner to secure hermetic seal.

Thereafter, the lower part of the inner container 2 is placed in the lower container half 3c so as to be entirely housed therein, and the lower end of the upper container half 3b and the upper end of the lower container half 3c are fusion bonded together in a manner to secure hermetic seal.

When placing the upper part of the inner container 2 into the upper outer container half 3b, a pair of pads 13, 13 may be interposed between the side walls of the upper container half 3b and the inner container 2 so that these two walls are equi-spaced from each other around their peripheries. The pads 13 and 13 may be removed before joining the upper and lower container halves 3b and 3c together.

The assembly of the inner and outer containers is then placed in a vacuum atmosphere and subjected to an annealing at about 400–600° C. until the metal oxide film on the insulator film 6 turn into black or blue and transform into a transparent highly-reflective blue metal oxide film 7.

This annealing serves to eliminate any unwanted oxygen or other atoms to allow resistivity of the highly-reflective metal oxide film to decrease by one order of magnitude. For example, a metal oxide film having a resistivity in the order of $10^{-3}$-cm can be reduced to the order of $10^{-4}$ $\Omega$-cm. Further, since the annealing process increases the concentration of carriers in the metal oxide film from the order of $10^{19}$ $cm^{-3}$ to order of $10^{20}$ or $10^{21}$ $cm^{-3}$, reflective power of the film to electromagnetic waves are increased and thus its effectiveness to prevent radiant heat transmission is also improved.

Then, as shown in FIG. 1, conductors 9, 9 connected to electrodes 8a and 8b, respectively, are pulled out through the conductor port 10 to the exterior of the outer container 3, sand the conductor port 10 is sealed. The ends of the conductors 9, 9 are connected to a power supply 14.

Furthermore, after creating a vacuum in the closed space 4 and the tip tube 11 is sealed, the entire assembly is subjected to cooling, and the thermal-insulation container with electric heater 1 comprising an evacuated closed space 4 is obtained.

The conductor port 10 may be provided at any suitable locations depending on the configuration of the conductor 10. Preferably, those portions of the conductors 9, 9 pulled out from the conductor port 10 are disposed concealedly, for example, by covering them with a plastic material or the like, at a suitable part of the outer container 3.

In the thermal-insulation container with electric heater 1 of the present invention, a highly-resistive metal oxide film having a resistivity higher than $1 \times 10^{-5}$ $\Omega$-cm as measured based on a van der Pauw's method and a pair of electrodes 8a and 8b for supplying an electric current to the metal oxide film are provided on the surface of the inner container 2 facing closed space 4, applying electricity to the highly-resistive metal oxide film 5 having such a high resistivity will cause its resistance to generate heat, thus allowing the highly-resistive metal oxide film 5 to serve as an electric heater. When using inner and outer containers of metal in the instant preferred embodiment, an insulator film may be provided as interposed between the inner container and the highly-resistive metal oxide film.

In the instant preferred thermal-insulation container with electric heater 1 of the present invention, physical contact of oxide film 5 with the inner container 2, which serves as a heater is ensured. For this reason, heat exchange efficiency is substantially improved compared to similar products of the prior art in which heaters or inner container bottom are complicated in their configurations.

Moreover, since the highly-resistive metal oxide film 5 formed on the external surface of the inner container 2 itself has a capability to generate heat, and therefore the inner container 2 can be heated over a larger surface area of the inner container 2. Therefore, efficiency in heating the contents of the inner container 2 can be effectively improved.

In the instant preferred embodiment, since the insulator film 6 and the highly-reflective metal oxide film 7 are provided, the heat generated by the highly-resistive metal oxide film 5 is hindered from transmitting toward the closed space 4, and most of the generated heat propagates toward the inner-container 2. Therefore, the heating efficiency is additionally improved.

Further, since the electrodes 8a and 8b are covered by the insulator film 6 and the low-resistive metal oxide film 7, therefore oxidization of the electrodes 8a, 8b due to the residual oxygen in the closed space 4 can be effectively prevented.

Moreover, if the inner and outer containers 2 and 3 made of glass are used in the instant preferred thermal-insulation container with electric heater 1, the contents of the inner container 2 can be readily observed from outside, because the highly-resistive metal oxide film 5, the insulator film 6, and the highly-reflective metal oxide film 7 are all transparent.

Furthermore, since the inner and outer containers 2 and 3 are joined only at their openings 2a and 3a along their peripheral edges, heat transmission from the inner container 2 to outer container 3 can be substantially reduced by the closed space 4 serving as a thermal barrier. Thus, heat loss due to conduction can be substantially reduced and thus improving the thermal efficiency.

In the instant preferred embodiment, the electrodes 8a and 8b extend (axially) from the opening 2a of the inner container 2 to its bottom 2b parallel and adjacent to each other with the slit 12 interposed therebetween, as shown in FIG. 1.

When electrodes 8a, 8b and the slit 12 are disposed as shown in FIG. 1, the electric current flows along the peripheral direction of the container 1 (as shown by arrow e in FIGS. 1 and 2) to cause the highly-resistive metal oxide film 5 between the electrodes 8a and 8b to generate heat.

Thus, positioning the electrodes 8a and 8b as shown in FIG. 1, the distance between the electrodes 8a and 8b corresponding to the peripheral spread of the metal oxide film 5 is maximized to increase the resistance of film 5, and consequently the heat output can be effectively increased to improve heating efficiency.

Figure 6:
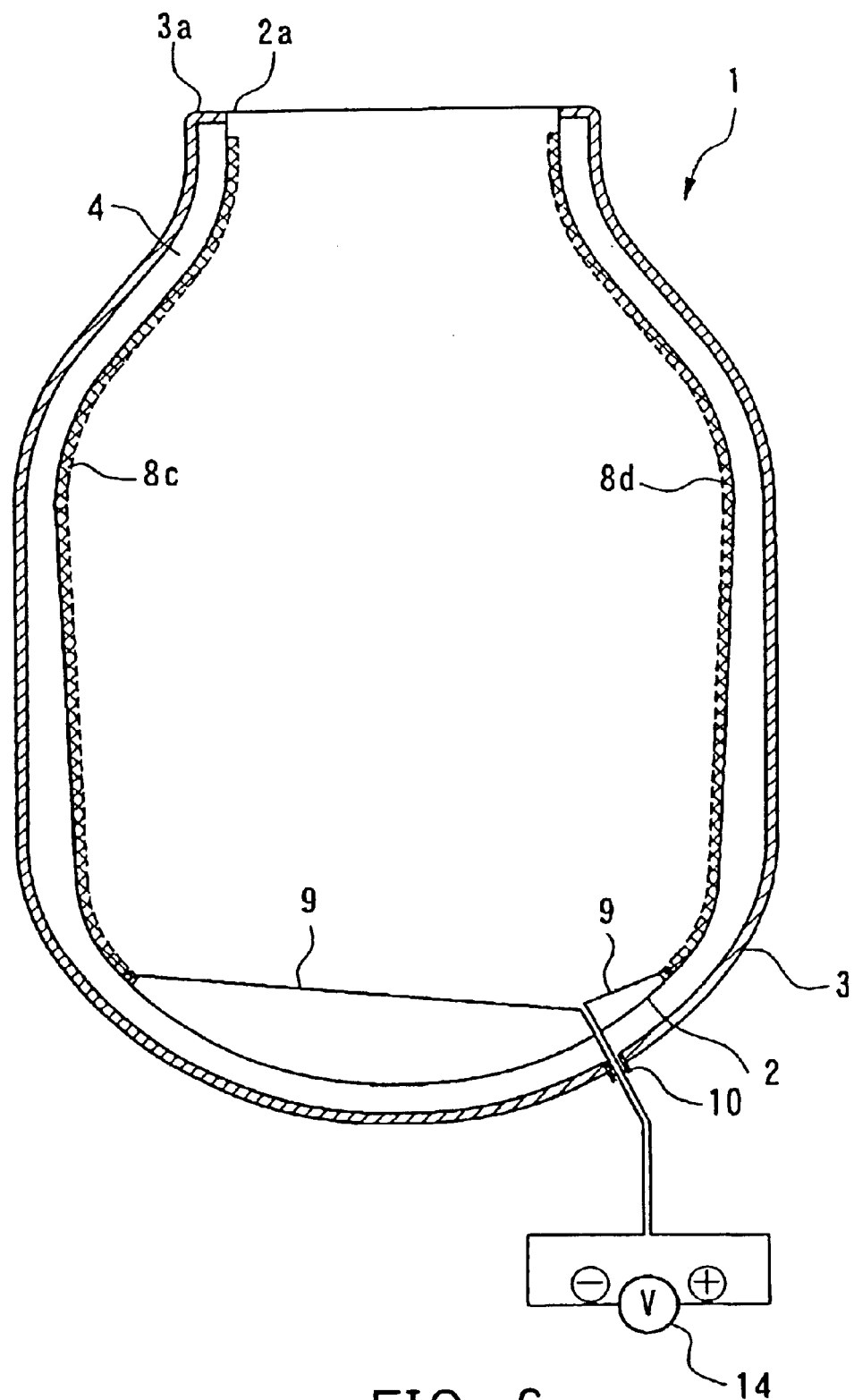
FIG. 6 is an axial view of an thermal-insulation container with electric heater according to another preferred of the present invention.

FIG. 6 shows a thermal-insulation container with electric heater according to another preferred embodiment of the present invention.

In the instant preferred embodiment, electrodes 8c and 8d are about 180° spaced apart from each other in almost a rotationally symmetrical relation with respect to the axis of the inner container 2 and axially thereof.

No slit is provided in the inner container 2 of the instant preferred embodiment, but a highly-resistive metal oxide film 5 is formed on and around the whole external surface of the inner container 2, and an insulator film 6 and a highly-reflective metal oxide film 7 are formed on the surface of the inner container 2 facing a closed space 4.

In the instant preferred embodiment of the present invention, the current flows from the electrode 8c to 8d clockwise on one side of the metal oxide film 5 and counterclockwise on its other side, causing the same to generate heat.

In the instant preferred embodiment of the present invention, since it is not necessary to provide a slit, it involves fewer process steps as compared with the preceding preferred embodiment and is easier to manufacture.

Figure 7:
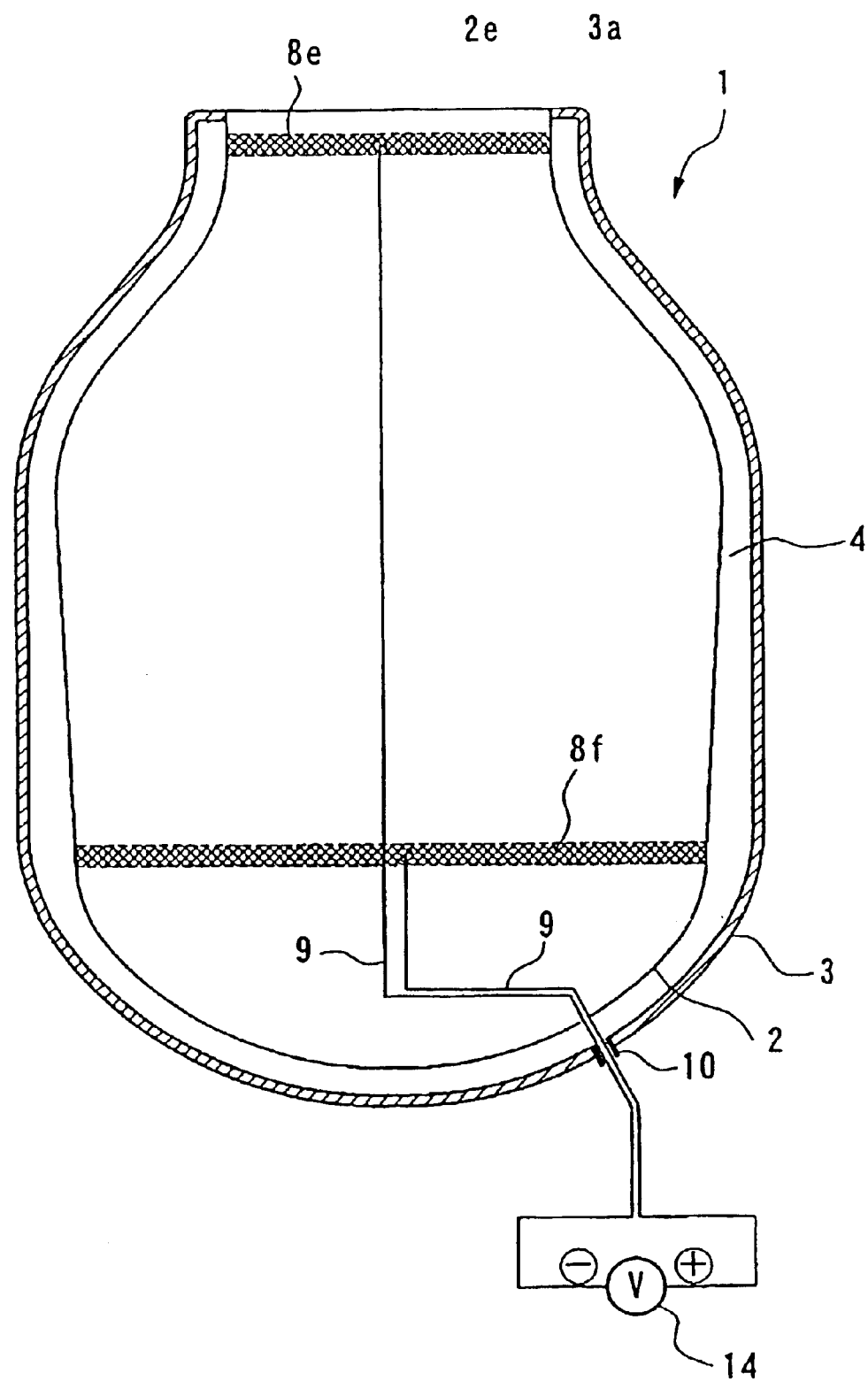
FIG. 7 is a view of a thermal-insulation container with electric heater according to yet another preferred embodiment of the present invention.

FIG. 7 shows a thermal-insulation container with electric heater according to yet another preferred embodiment of the present invention.

In the instant preferred example, one electrode 8e is formed on a peripheral surface at an upper part of the inner container 2 in the vicinity of its opening 2a, with a counterpart electrode 8f being formed on a peripheral surface at a lower part of the inner container 2.

In the instant embodiment of the present invention, a highly-resistive metal oxide film 5 is formed on and around the whole external surface of the inner container 2, and an insulator film 6 and a highly-reflective metal oxide film 7 are formed on the surface of the inner container 2 facing a closed space 4, with the current flowing from the upper electrode 8e to lower electrode 8f to cause the highly-resistive metal oxide film 5 interposed therebetween to generate heat.

In the instant preferred embodiment of the present invention, since electrodes 8e and 8f are more simplified in their shapes as compared with the preceding two preferred embodiments, and therefore it is much more easier to manufacture.

Although the electrode unit 8 has two electrodes placed at desired positions in the above described three preferred embodiments, the present invention is not limited to only two electrodes, accordingly three or more electrodes may be provided depending on the requirements so that electrodes may be selected to achieve any required heating capacity.

Besides, although in the foregoing preferred embodiments of the present invention, the insulator film 6 and the highly-reflective metal oxide film 7 are formed on the surface of the electrode unit 8 facing the closed space 4 as shown in FIG. 3, the electrode section of the thermal-insulation container with electric heater of the present invention is not limited to this arrangement.

Figure 5:
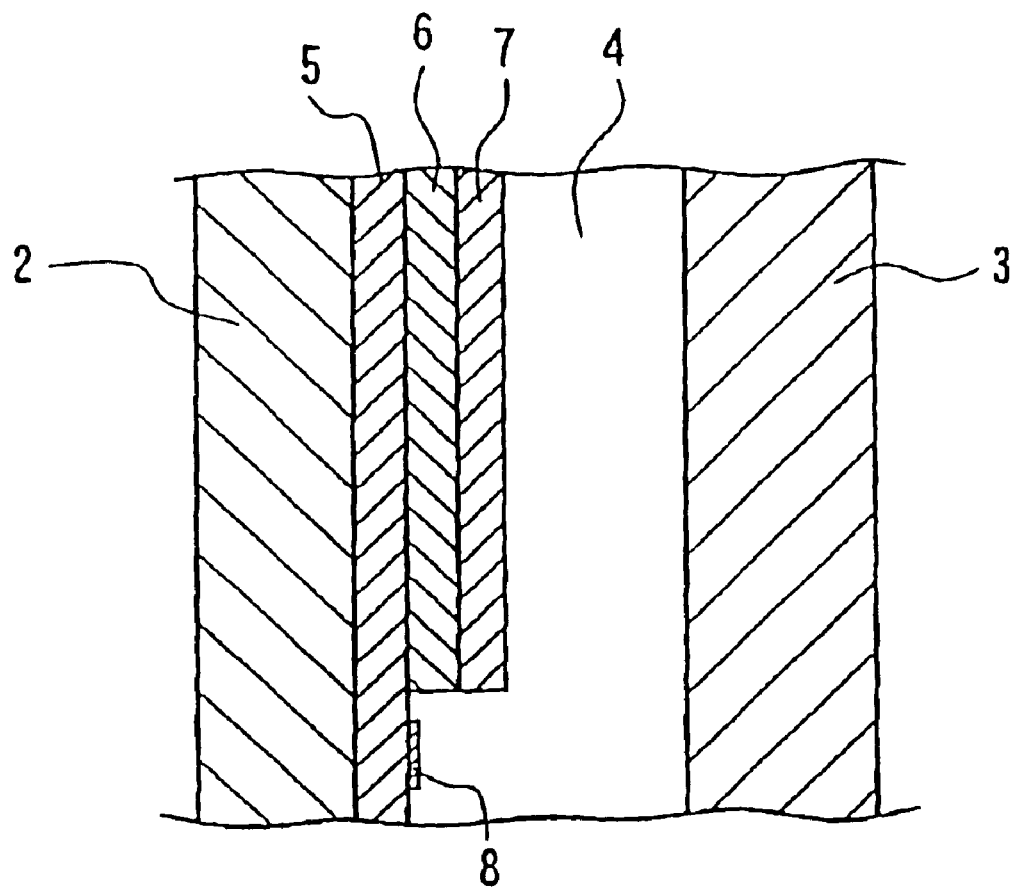
FIG. 5 is an enlarged partial cross-sectional view of another example of the electrode unit used in the thermal-insulation container with electric heater of the present invention.

Another exemplary arrangement of the electrode 8 of the thermal-insulation container with electric heater of the present invention can be applicable to any of the above-described preferred embodiments is shown in FIG. 5.

In this example shown in FIG. 5, the highly-resistive metal oxide film 5 and the electrode 8 formed thereon are not covered with the insulator film 6 and the highly-reflective metal oxide film 7.

Such an arrangement may be accomplished merely by masking the electrode 8 formed on the highly-resistive metal oxide film 5 before forming the insulator film 6 and the highly-reflective metal oxide film 7.

In the above-described preferred embodiments, although the double-walled thermal-insulation container with electric heater 1 is manufactured by first forming the highly-resistive metal oxide film 5 on the inner container 2, subsequently forming the electrode unit 8 on the metal oxide film, then forming the insulator film 6 and the highly-reflective metal oxide film 7, thereafter joining the inner and outer containers 2 and 3 together, followed by annealing and sealing, the sequence of the process steps for manufacturing the thermal-insulation container having electric heater of the present invention is not particularly limited to the above process sequence.

Accordingly, a process comprising first forming the highly-resistive metal oxide film, the electrode and the insulator film on the inner container, and joining the inner and outer containers together, then injecting a coating solution in the closed space to form the highly-reflective metal oxide film, followed by annealing, and sealing of the degassing tip tube may also be carried out to manufacture the thermal-insulation container with electric heater of the present invention with improved thermal efficiency.

Accordingly, yet another process which is identical to that just described above, except that the steps of forming the insulator film and joining the inner and outer containers are reversed in their sequence may also be carried out to manufacture the thermal-insulation container with electric heater of the present invention with improved thermal efficiency.

However, in the above-described two alternative processes, since it is difficult to adopt sputtering or vapor deposition technologies for forming the highly-reflective metal oxide film after joining the inner and outer containers, it is desirable to use a sol-gel process for this purpose.

In the thermal-insulation containers having electric heater of the prior art, a metal film for preventing radiant heat could not be provided at an opening of the container, because such a metal film at the opening increased heat loss due to conduction therethrough. However, since the thermal conductivity of the highly-reflective metal oxide film used in the above-mentioned preferred embodiments is approximately $\frac{1}{100}$ of thermal conductivity of ordinary metals, there can be hardly any heat loss by conduction even if the highly-reflective metal oxide film is provided at the opening of the container. Therefore, according to the present invention, by providing the highly-reflective metal oxide film provided at the opening of an inner container 3, it is not only effective in reducing the heat loss by conduction but also heat loss by heat radiation, consequently reducing power consumption.

Although that the inner and outer containers 2 and 3 are made of transparent glass in the above-described preferred embodiments, the inner and outer containers 2 and 3 may be of metal instead. In this case, an improved thermal efficiency can be also achieved like the above-mentioned preferred embodiments, although the interior of the inner container cannot be readily seen from the exterior.

As described hereinbefore, in the thermal-insulation container with electric heater of the present invention comprising the inner container housed in the outer container integrally therewith so as to define a closed space separating the inner container from the outer container, the arrangement that the highly-resistive metal oxide film having a resistivity higher than approximately $1 \times 10^{-5}$ Ω-cm and the electrode unit for applying electric current thereto are provided on the external side of the inner container facing the closed space allows the highly-resistive metal oxide film to generate heat efficiently over a larger surface area of the inner container, thus ensuring a high thermal efficiency.

Further, because the low-resistive metal oxide film having a resistivity lower than that of the highly-resistive metal oxide film is provided on the surface of the latter film facing the closed space with the insulator film interposed therebetween, this arrangement is effective in preventing radiant heat to further improve thermal efficiency.

Furthermore, if the inner and outer containers are made of glass and the highly-resistive metal oxide film, the insulator film, and the low-resistive metal oxide film are formed of transparent materials, the interior of the inner container can be readily visualized from outside of the thermal-insulation container.

Finally, since the inner and outer containers are joined together only at their openings, the closed space serving as a thermal barrier suppresses heat loss and also contributes to an improved thermal efficiency.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What is claimed is:

1. A thermal-insulation container with electric heater comprising an inner container and an outer container, said inner container being housed in said outer container integrally therewith so as to define a closed space separating the same from said outer container, said thermal-insulation container with electric heater comprising:
   a highly-resistive metal oxide film formed on an external surface of said inner container facing said closed space; and
   an electrode unit provided on an external surface of said highly-resistive metal oxide film facing said closed space for applying an electric current to said highly-resistive metal oxide film;
   wherein said highly-resistive metal oxide film reflects incident infrared rays by at least 40%.

2. A thermal-insulation container with electric heater comprising an inner container and an outer container, said inner container being housed in said outer container integrally therewith so as to define a closed space separating the same from said outer container, said thermal-insulation container with electric heater comprising:
   a highly-resistive metal oxide film formed on an external surface of said inner container facing said closed space;
   an electrode unit provided on an external surface of said highly-resistive metal oxide film facing said closed space for applying an electric current to said highly-resistive metal oxide film; and
   a highly-reflective metal oxide film reflecting incident infrared rays by at least 40% provided on an external surface of said highly-resistive metal oxide film facing said closed space through the intermediary of an insulator film interposed therebetween.

3. The thermal-insulation container with electric heater according to claim 1, wherein said outer container and said inner container are made of glass, and wherein said highly-resistive metal oxide film, said insulator film and said highly-reflective metal oxide film are transparent.

4. The thermal-insulation container with electric heater according to claim 2, wherein said outer container and said inner container are made of glass, and wherein said highly-resistive metal oxide film, said insulator film and said highly-reflective metal oxide film are transparent.

5. The thermal-insulation container with electric heater according to claim 1, wherein said inner container is joined with said outer container only along a peripheral edge of an opening of said thermal-insulation container with electric heater.

6. The thermal-insulation container with electric heater according to claim 2, wherein said inner container is joined with said outer container only along a peripheral edge of an opening of said thermal-insulation container with electric heater.

* * * * *